(12) United States Patent
Cleeves et al.

(10) Patent No.: US 9,194,288 B2
(45) Date of Patent: Nov. 24, 2015

(54) HIGH SWIRL ENGINE

(75) Inventors: James M. Cleeves, Redwood City, CA (US); Simon D. Jackson, Redwood City, CA (US); Michael A. Willcox, Mountain View, CA (US)

(73) Assignee: Pinnacle Engines, Inc., San Carlos, CA (US)

( * ) Notice: Subject to any disclaimer, the term of this patent is extended or adjusted under 35 U.S.C. 154(b) by 1005 days.

(21) Appl. No.: 12/860,061

(22) Filed: Aug. 20, 2010

(65) Prior Publication Data

US 2011/0041799 A1 Feb. 24, 2011

Related U.S. Application Data

(60) Provisional application No. 61/235,496, filed on Aug. 20, 2009.

(51) Int. Cl.

| F02B 75/28 | (2006.01) |
| F02B 1/02 | (2006.01) |
| F02B 25/08 | (2006.01) |
| F02B 31/06 | (2006.01) |
| F02F 1/18 | (2006.01) |
| F02M 35/10 | (2006.01) |

(52) U.S. Cl.
CPC . *F02B 75/28* (2013.01); *F02B 1/02* (2013.01); *F02B 25/08* (2013.01); *F02B 31/06* (2013.01); *F02F 1/186* (2013.01); *F02M 35/10262* (2013.01); *Y02T 10/146* (2013.01)

(58) Field of Classification Search
CPC ..... Y02T 10/146; Y02T 10/12; Y02T 10/125; F02B 2275/42; F02B 3/06

USPC ......... 123/262, 263, 275, 290, 295, 301, 302, 123/305, 306, 307, 308, 309, 430, 432, 433
See application file for complete search history.

(56) References Cited

U.S. PATENT DOCUMENTS 1,377,798 A * 5/1921 Berckenhoff ................. 123/312
1,837,870 A 12/1931 Johnston
(Continued)

FOREIGN PATENT DOCUMENTS

AT 96732 B 4/1924
DE 966 044 C 7/1957
(Continued)

OTHER PUBLICATIONS

PCT International Search Report dated Apr. 20, 2011, issued in connection with corresponding PCT application No. PCT/US2010/046095.

(Continued)

*Primary Examiner* — Erick Solis
*Assistant Examiner* — Carl Staubach
(74) *Attorney, Agent, or Firm* — Mintz Levin Cohn Ferris Glovsky and Popeo, P.C.

(57) ABSTRACT

An internal combustion engine can include a combustion volume within a cylinder of an internal combustion engine. The combustion volume can be defined at least by a cylinder wall and a first piston in the cylinder. A swirl port can deliver a fluid into the combustion volume via a swirl port outlet such that the delivered fluid is directed around a periphery of the cylinder with a fluid velocity disposed at a predetermined angle away from tangential to a curve of the cylinder wall to generate a swirling motion in the combustion volume.

19 Claims, 13 Drawing Sheets

Section B-B

(56) References Cited

U.S. PATENT DOCUMENTS

| | | | |
|---|---|---|---|
| 1,889,946 A | | 12/1932 | Cadwell |
| 1,972,805 A | | 9/1934 | Vanni |
| 2,018,848 A | | 10/1935 | Gruebler |
| 2,058,350 A | * | 10/1936 | Petter .................... 123/65 E |
| 2,065,600 A | * | 12/1936 | Meyer ...................... 123/81 C |
| 2,215,281 A | * | 9/1940 | Von Haase ................ 415/127 |
| 2,231,392 A | | 2/1941 | McCarthy |
| 2,646,779 A | | 7/1953 | Fiser |
| 2,699,765 A | * | 1/1955 | Taylor ...................... 123/65 A |
| 2,758,578 A | * | 8/1956 | Hopkins ................... 123/301 |
| 2,840,062 A | | 6/1958 | Classen |
| 2,864,347 A | * | 12/1958 | Davis et al. ............... 123/301 |
| 2,958,314 A | * | 11/1960 | Mitchell ................... 123/301 |
| 3,485,221 A | | 12/1969 | Feedback |
| 3,945,363 A | | 3/1976 | Elsbett et al. |
| 3,948,241 A | | 4/1976 | Melchior |
| 4,344,394 A | * | 8/1982 | Showalter ................. 123/306 |
| 4,543,929 A | | 10/1985 | Kataoka et al. |
| 4,641,617 A | | 2/1987 | Aoyama et al. |
| 4,745,890 A | | 5/1988 | Wyczalek et al. |
| 4,760,821 A | | 8/1988 | Aupor et al. |
| 4,856,463 A | | 8/1989 | Johnston |
| 5,058,536 A | | 10/1991 | Johnston |
| 5,435,283 A | | 7/1995 | Zehr |
| 5,855,194 A | * | 1/1999 | Okumura et al. ........... 123/308 |
| 5,884,598 A | * | 3/1999 | Kawashima ............. 123/188.8 |
| 6,039,011 A | | 3/2000 | Agalarov et al. |
| 6,062,192 A | | 5/2000 | Wirth et al. |
| 7,559,298 B2 | * | 7/2009 | Cleeves ..................... 123/48 R |
| 7,707,989 B2 | * | 5/2010 | Andou et al. .............. 123/306 |
| 7,878,172 B2 | * | 2/2011 | Fritz et al. ................. 123/306 |
| 8,051,830 B2 | * | 11/2011 | Taylor ....................... 123/308 |
| 8,544,445 B2 | | 10/2013 | Cleeves et al. |
| 2002/0112693 A1 | | 8/2002 | Stutz et al. |
| 2008/0115771 A1 | | 5/2008 | Elsbett |
| 2009/0159041 A1 | | 6/2009 | Andou et al. |

FOREIGN PATENT DOCUMENTS

| | | |
|---|---|---|
| DE | 197 40 962 A1 | 3/1998 |
| EP | 0 067 700 A1 | 12/1982 |
| EP | 0 134 038 A1 | 3/1985 |
| EP | 0 409 428 A1 | 1/1991 |
| EP | 0 802 319 A1 | 10/1997 |
| EP | 0 909 885 A2 | 4/1999 |
| EP | 1 061 247 A2 | 12/2000 |
| EP | 1 251 252 A1 | 10/2002 |
| EP | 2 017 454 A1 | 1/2009 |
| GB | 11239 A | 0/1902 |
| GB | 284 735 A | 2/1928 |
| GB | 288 466 A | 4/1928 |
| GB | 2 027 798 A | 2/1980 |
| JP | S58-150002 A | 9/1983 |
| JP | S62-174534 A | 7/1987 |
| JP | H02-42119 A | 2/1990 |
| JP | H07 158459 A | 6/1995 |
| JP | H07-166874 A | 6/1995 |
| JP | H09-170441 A | 6/1997 |
| JP | 2007-239668 A | 9/2007 |
| JP | 2009-156193 A | 7/2009 |
| JP | 2010-025105 A | 2/2010 |
| TW | M345132 U | 11/2008 |
| TW | M347466 U | 12/2008 |
| TW | M347471 U | 12/2008 |
| WO | WO-2007006469 A2 | 1/2007 |
| WO | WO-2007121086 A2 | 10/2007 |

OTHER PUBLICATIONS

Non-Final Office Action dated Feb. 20, 2014 for Taiwan patent application No. 099127962.

Supplementary European Search Report issued in European Application No. EP 10810634, dated Sep. 4, 2014.

\* cited by examiner

FIG. 3  Section B-B

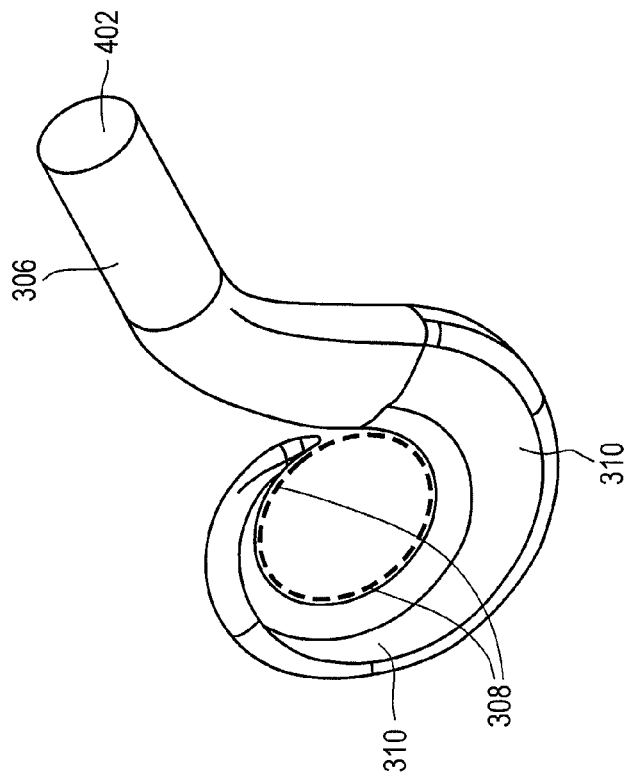
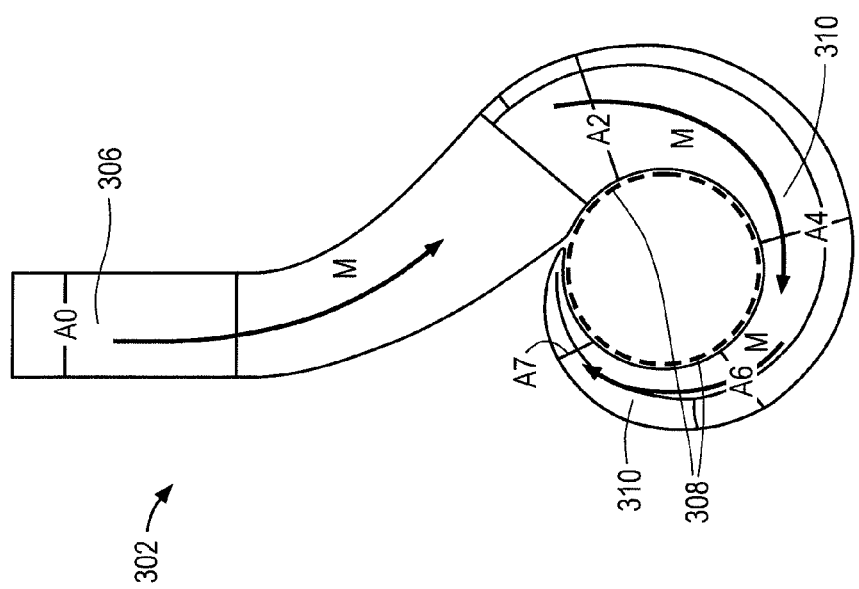
FIG. 7B
FIG. 7A

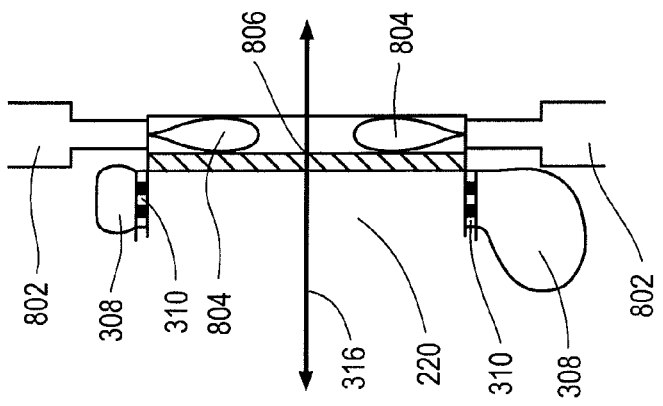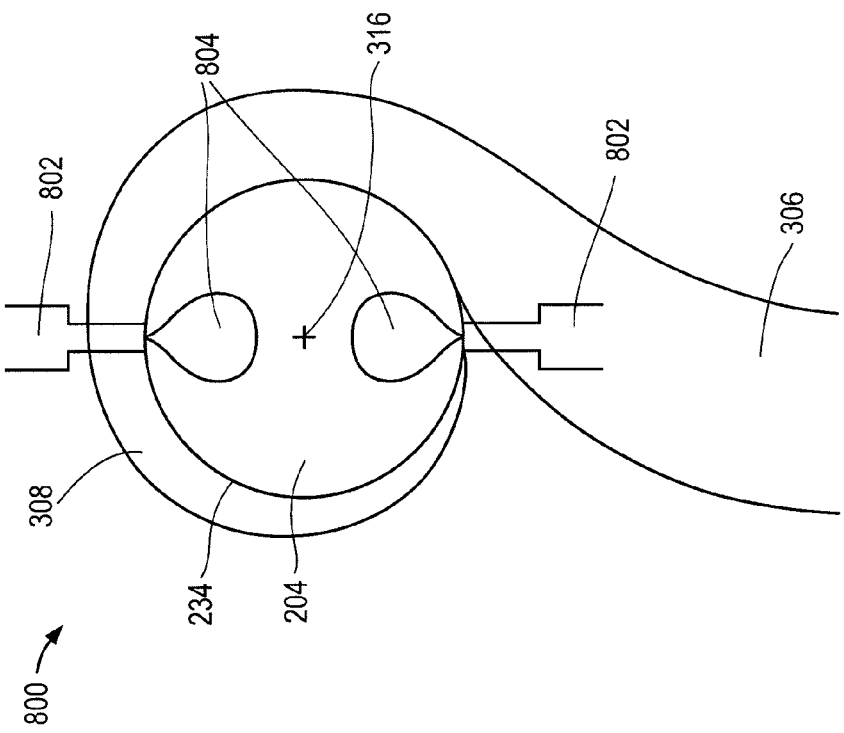

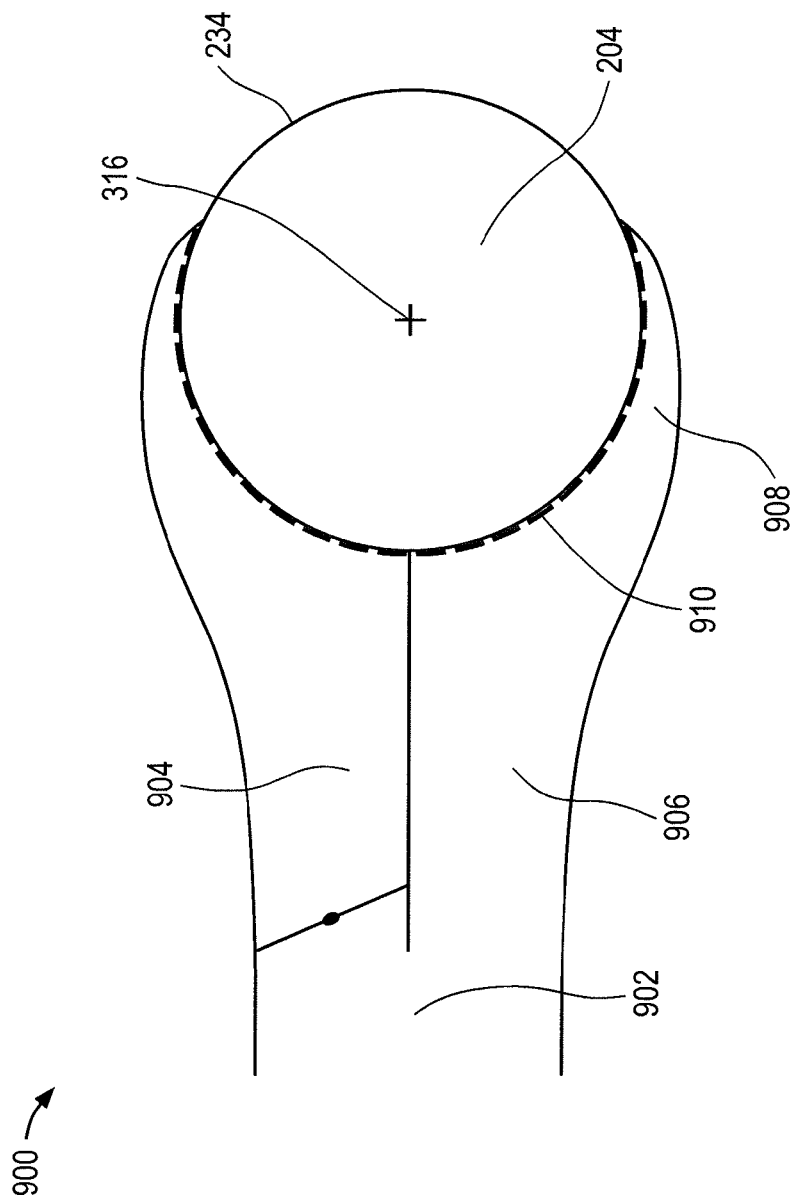

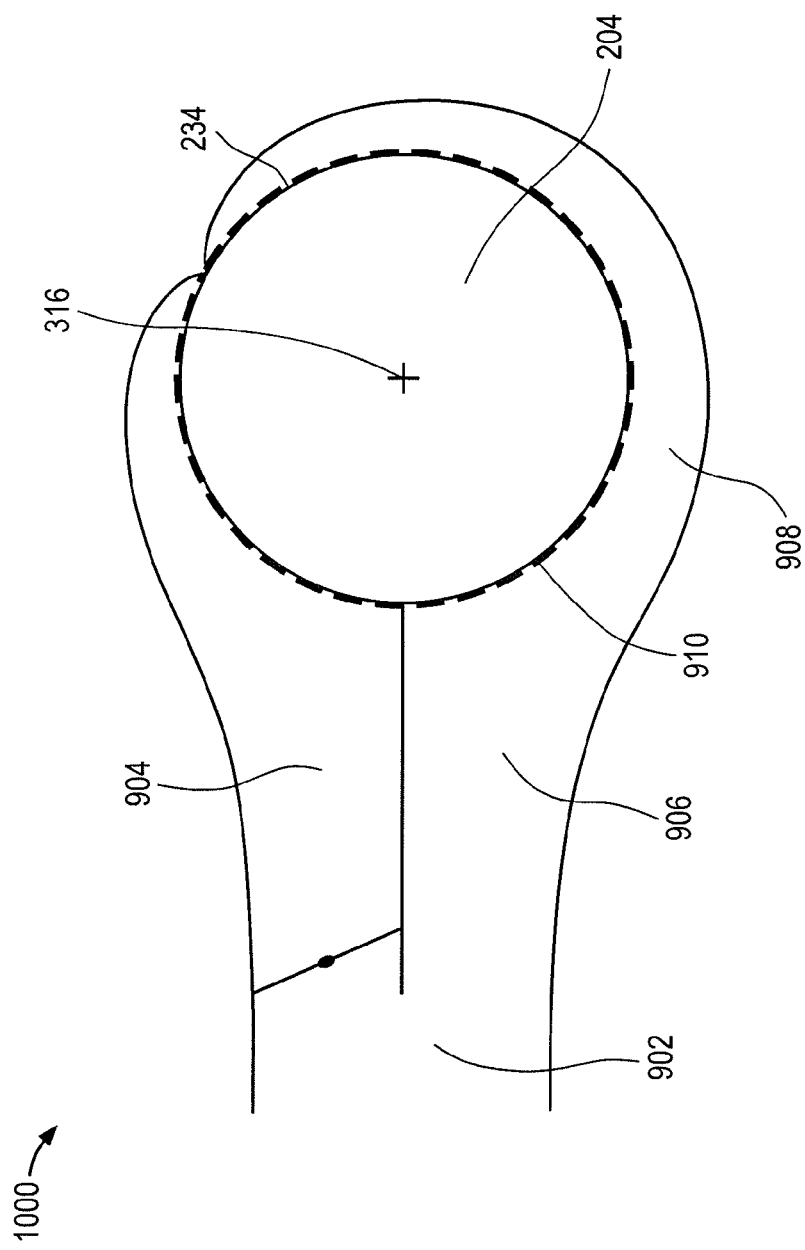

HIGH SWIRL ENGINE

CROSS REFERENCE TO RELATED APPLICATIONS

This application claims the benefit under 35 U.S.C. §119 (e) of U.S. Provisional Application No. 61/235,496, entitled "High Swirl Engine" and filed on Aug. 20, 2009, the disclosure of which is hereby incorporated by reference in its entirety. One or more aspects of the subject matter described herein can be implemented in an internal combustion engine that incorporates a sleeve valve such as those described in co-pending and co-owned U.S. Pat. No. 7,559,298 and U.S. patent application Ser. No. 12/720,457, which are also incorporated by reference herein in their entireties.

TECHNICAL FIELD

The subject matter described herein relates to features of internal combustion engines.

BACKGROUND

Inconsistent ignition of air/fuel mixtures in internal combustion engines can result in variations in the ignition delay and burn duration of the fuel mixture in a cylinder. Such inconsistency can lead to significant variation in peak pressures and temperatures within the cylinder and can, in knock limited engines, limit the spark timing and/or compression ratio, thereby complicating accurate setting of the spark timing close to the knock limit. Variations in burn speed and duration of the burn can also translate directly into variations in efficiency. Typical coefficients of variation in indicated mean effective pressure (IMEP), which represents the average pressure over a cycle in the combustion chamber of a cylinder, can be approximately 1.5%. In other words, assuming a normal distribution, the least effective three cycles out of a thousand cycles with the same fuel input generate 9% (6×1.5%) less work than the most effective three cycles out of the thousand. Moreover, if the ignition must be retarded to avoid knock in the quickest burning cycles, ignition timing can be compromised on the remaining slower burning cycles which can compromise torque and efficiency.

Slow flame speed can also limit how late spark ignition can be initiated in the combustion cycle while still achieving a complete burn. The effectiveness of currently available high swirl engines is often limited by the high heat transfer rate between the gases in the cylinder and the walls of the cylinder that results from the high velocity gas motion created in the cylinder. The effectiveness of traditional engines with high velocity gas motion can also be impacted by the pressure drop in the intake passage necessary to induce a high gas velocity. This pressure drop can limit the maximum flow of air through a cylinder of the engine and hence the maximum power achievable. Also, with additional combustion stability, a leaner mixture can be ignited for a given coefficient of variation of IMEP.

SUMMARY

In one aspect, an internal combustion engine includes a combustion volume within a cylinder of an internal combustion engine. The combustion volume is defined at least by a cylinder wall and a first piston in the cylinder. A swirl port delivers a fluid into the combustion volume via a swirl port outlet such that the delivered fluid is directed around a periphery of the cylinder with a fluid velocity disposed at a predetermined angle away from tangential to a curve of the cylinder wall to generate a swirling motion in the combustion volume. The swirling motion occurs at a swirl rate quantified by a swirl number that indicates a number of revolutions around the cylinder made by the fluid during a cycle of the piston.

In another interrelated aspect, a method includes delivering a fluid into a combustion volume within a cylinder of an internal combustion engine via a swirl port. The combustion volume is defined at least by a cylinder wall and a first piston in the cylinder. The delivered fluid is directed around a periphery of the cylinder with a fluid velocity disposed at a predetermined angle away from tangential to a curve of the cylinder wall. The directing of the delivered fluid generates a swirling motion in the combustion volume prior to ignition of the fluid. The swirling motion occurs at a swirl rate quantified by a swirl number that indicates a number of revolutions around the cylinder made by the fluid during a cycle of the piston.

In some variations one or more of the following can optionally be included. The engine can include a spark source that ignites the fluid in the combustion volume. An inlet of the swirl port can have a first cross sectional flow area. A swirl port outlet region that comprises the swirl port outlet can have a second cross sectional flow area that decreases with distance from the inlet. The swirl port outlet can be unchanging in size (for example in width) with distance from the inlet. The engine can include a sleeve valve that includes the swirl port. The sleeve valve can be disposed at least partially around the cylinder. The swirl port can include a tube of decreasing cross sectional area. The swirl number can be equal to a tangential velocity of the fluid as it exits the swirl port outlet into the cylinder divided by the circumference of the cylinder and a crankshaft rotation rate of a crankshaft of the engine. The tangential velocity can be equal to the cosine of an exit angle of the fluid passing through the swirl port outlet into the cylinder times a flow velocity of the fluid in the swirl port.

The engine can include a fuel injector that delivers fuel to the combustion volume for a fuel delivery duration that is matched to the swirl rate to evenly distribute the delivered fuel throughout the combustion volume. In this case, the internal combustion engine can be a diesel engine. The engine can include a spark source and a fuel injector that delivers fuel to the combustion volume with injection timing that is matched to the swirl rate to evenly distribute the delivered fuel throughout the combustion volume. In this case, the internal combustion engine can be operated as a direct injection spark ignited engine. The fuel injector can be directed to create a richer fuel mixture region nearer the cylinder wall than a center of the cylinder. The fluid can include air, the spark source can be positioned at the periphery of the cylinder, and the fuel injector can inject the fuel such that droplets of the fuel are mixed with the delivered fluid so that the centripetal force induced by the swirl motion forces the droplets to the periphery of the cylinder to create a mixture gradient that comprises a more fuel rich region at the periphery for ignition by the spark source.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7A and FIG. 7B are front elevation and isometric views of the flow cavity of the swirl port of FIG. 6;

FIG. 8A and FIG. 8B are cross-sectional diagrams showing an example of direct fuel injection in conjunction with a high swirl port;

FIG. 9 is a schematic diagram showing a cross-sectional view of a split inlet port;

FIG. 10 is a schematic diagram showing a cross-sectional view of a split inlet port with accentuated swirl features;

Figure 1:
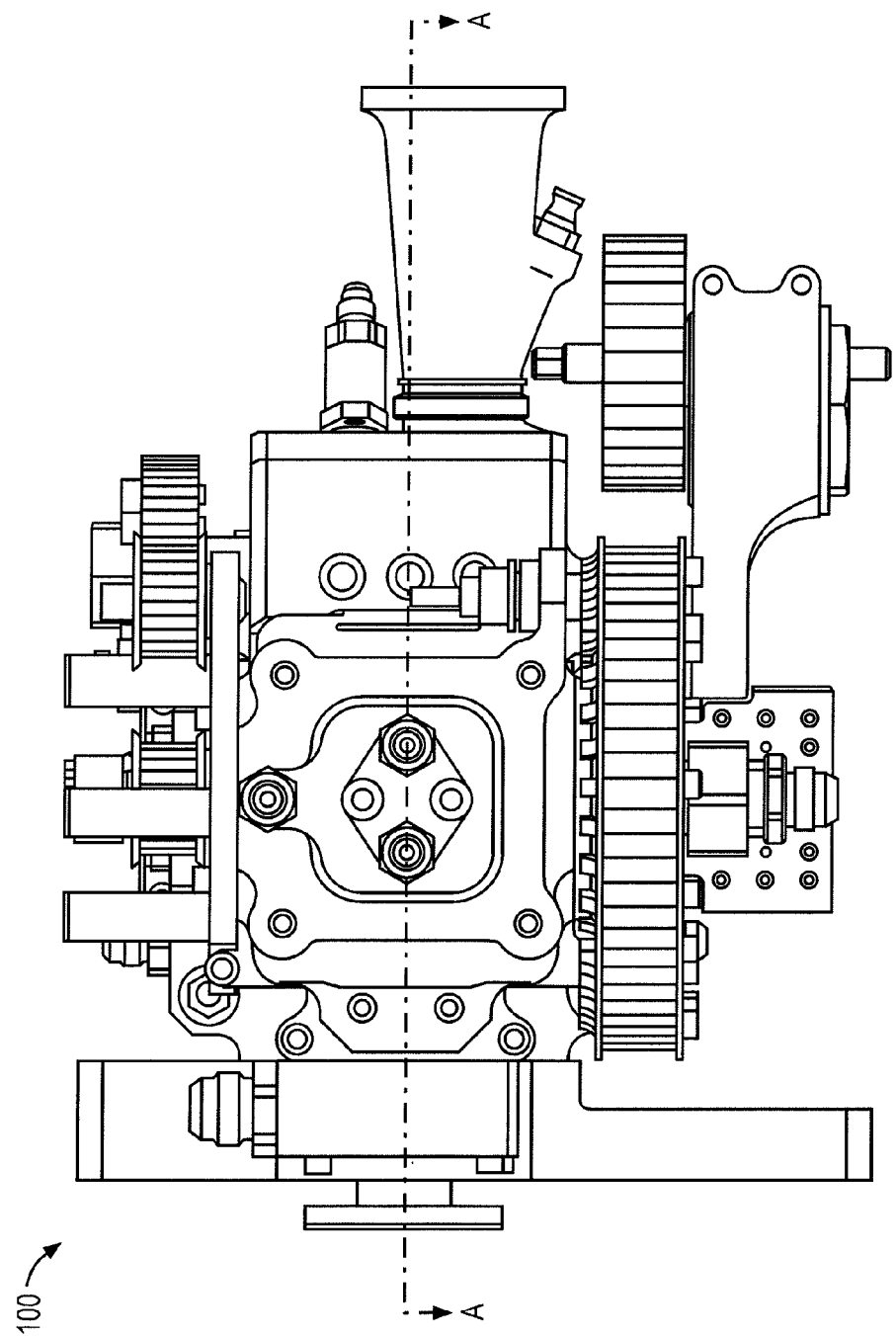
FIG. 1 is a schematic diagram showing a side view of an internal combustion engine with opposed pistons.

The current subject matter can provide numerous benefits and advantages relative to previously available technologies and techniques. Controlling an angle at which a fluid (i.e. air, an air and fuel mixture, or the like) enters into a cylinder can be useful in achieving a desired burn rate of the fuel in the combustion volume of the cylinder. Delivery of the fluid in a direction that is closer to normal to the cylinder axis can produce a slower burn rate but higher efficiency due to a lower level of turbulence reducing the heat loss to the cylinder walls. One or more of the structures, techniques, articles of manufacture, and the like described herein can be used, either alone or in combination, to optimize combustion conditions according to a matrix of desired but potentially competing performance metrics. In general, more swirl of the fluid in the combustion volume can provide enhanced burn characteristics overall with relatively lower heat transfer to the cylinder walls at lower engine loads. A fast burn rate can be achieved to enable a retarded ignition condition with a high compression engine to provide high efficiency at light loads where an engine in a motor vehicle is most often operated. Transitioning from a high swirl, high burn rate with retarded ignition condition to a lower swirl condition with a richer fuel mixture can provide better power characteristics under high loads. An engine using one or more features of the current subject matter can also be operated as a diesel or a direct injected spark ignited engine in that the high swirl characteristics in the combustion volume can sweep injected fuel throughout the combustion volume using a direct injection of fuel to the cylinder.

When practical, similar reference numbers denote similar structures, features, or elements. Descriptions of the features shown in the claims may include the use terms such as first and second, left and right, top and bottom, etc. in reference to the elements being described. It should be understood that such references are intended merely as relative terms used to distinguish between multiple instances of elements that have similar structure or to indicate a direction of motion relative to an illustrated orientation of one or more elements in a drawing or drawings and should not be construed as limiting the scope of the disclosure or of the claimed subject matter.

DETAILED DESCRIPTION

To address the above noted and potentially other challenges, implementations of the current subject matter provide methods, systems, articles of manufacture, and the like that can, among other possible advantages, deliver air or an air/fuel mixture to a combustion volume of an internal combustion engine in a manner that produces a rotational flow field in the combustion volume. The resulting high swirl state of fluid flow in the combustion volume can improve uniformity of combustion initiation, burn duration, ignition timing, and the like.

Some examples of internal combustion engines are described in co-owned and co-pending U.S. Pat. No. 7,559,298 and U.S. patent application Ser. No. 12/720,457, which have been incorporated herein by reference. The disclosed engines can provide a very large valve area for a given cylinder volume. Such a configuration can advantageously allow for a fluid port that delivers an air/fuel mixture, air alone, or some other fluid into the cylinder tangentially or within a predetermined angle of tangentially to the wall of the cylinder such that a swirl charge motion is initially introduced around the bore axis of the cylinder. Other configurations of inlet valves and engine geometries can also take advantage of one or more features of the subject matter disclosed herein.

FIG. 1 shows a schematic side view of an assembled opposed piston engine 100 that includes two pistons that share a common cylinder and that form a combustion volume defined by the pistons and the walls of the cylinder. Other engine configurations, such as for example those in which each piston is disposed in a separate cylinder whose combustion volume is formed by the piston, a cylinder head, and the walls of the cylinder, are also within the scope of the current subject matter.

Figure 2:
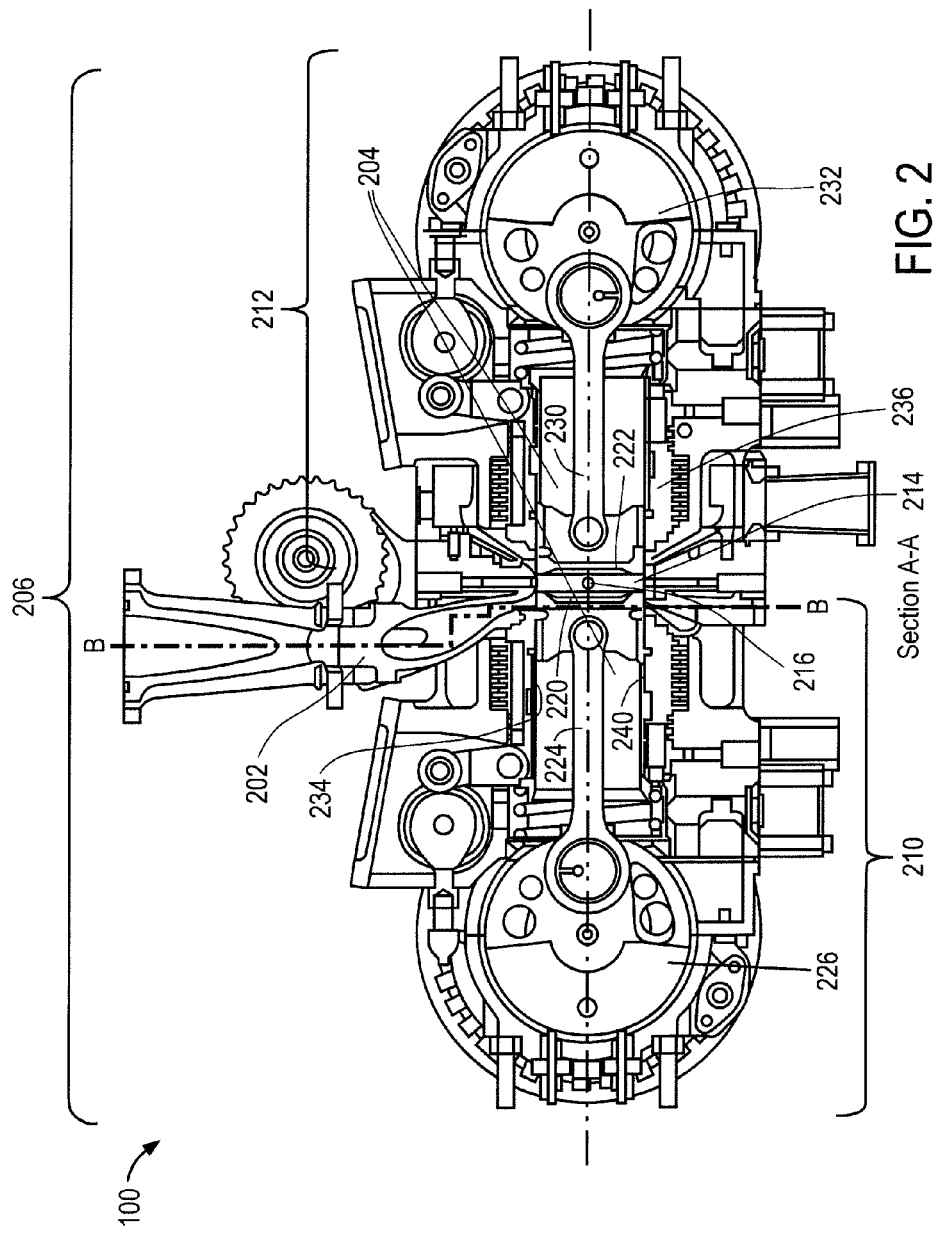
FIG. 2 is a schematic diagram showing a cross-sectional view of the internal combustion engine of FIG. 1 along the cut line A-A.

FIG. 2 is a cross-sectional view along cut line A-A of the engine 100 shown in FIG. 1. As shown in FIG. 2, a swirl port inlet 202 delivers the air/fuel mixture into a cylinder 204 that is defined by an engine body 206. As shown in FIG. 2, the engine body 206 can include a left casting 210 and a right casting 212 that are mounted to a center connecting piece 214 which can be in the form of a ring. The center connecting piece 214 can also include one or more spark plug sleeves 216 through which spark plugs can be inserted. The engine 100 is configured such that a left piston 220 and a right piston 222 reciprocate within the cylinder 204 along a centerline C of the cylinder 204. The left piston 220 is connected to a left connecting rod 224, which in turn connects to a left crankshaft 226. The right piston 222 is connected to a right connecting rod 230, which in turn connects to a right crankshaft 232. The left piston 220 reciprocates within the cylinder 204, and is slidably movable to the left and right along the cylinder wall 234. The right piston 222 also reciprocates within the cylinder 204, and is slidably movable to the left and right along the cylinder wall 234.

FIG. 2 also illustrates an oil-path defining piece 236. A sleeve valve body 240 can be slidably movable to the left and right (from the FIG. 2 perspective) relative to oil-path defining piece 236. In FIG. 2, the left piston 220 and right piston 222 are disposed in the cylinder 204 as they would be at Top Dead Center (TDC), with the combustion volume, which is defined by the cylinder wall 234, the valve seat, and the piston heads of the left piston 220 and right piston 222, at its smallest. An engine can be configured such that the ignition timing occurs either at, before, or after the minimum combustion volume.

Figure 3:
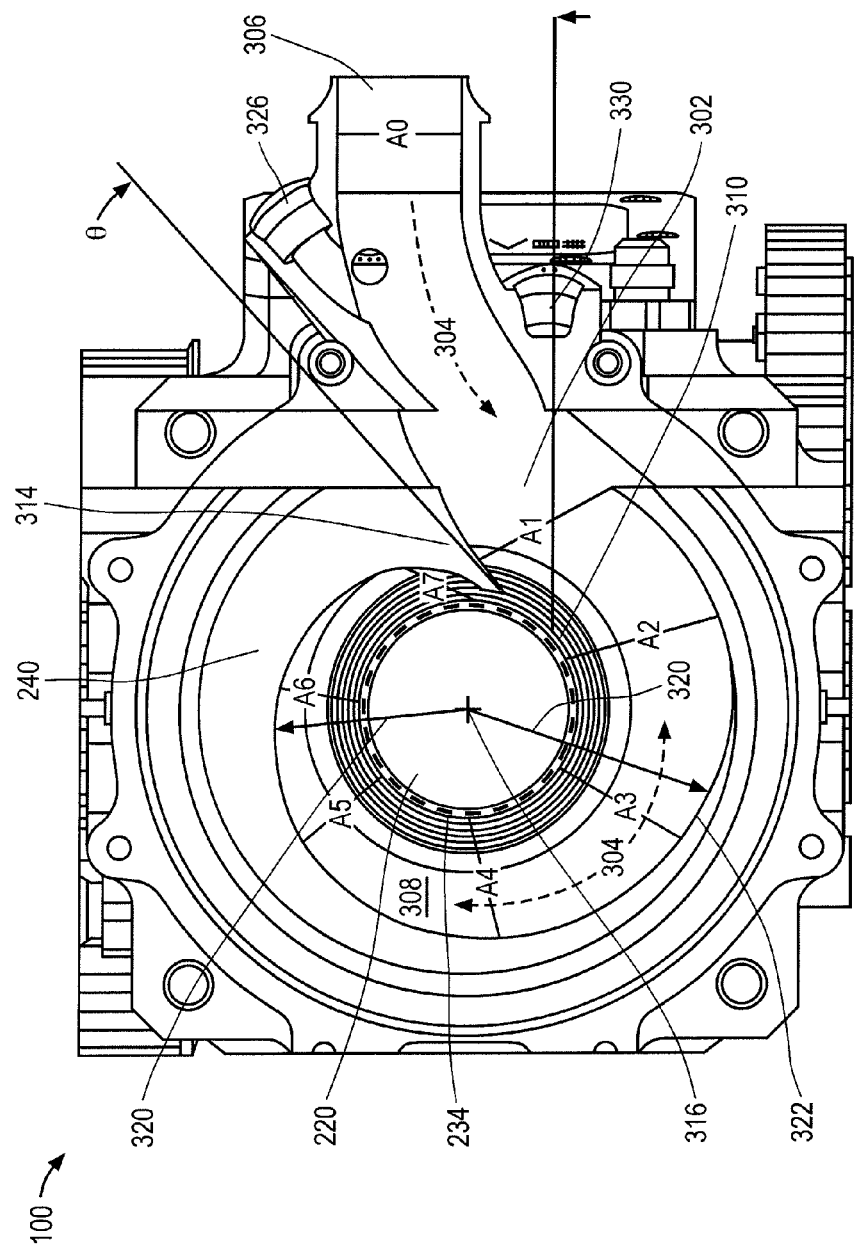
FIG. 3 is a schematic diagram showing a cross-sectional view of the internal combustion engine of FIG. 1 and FIG. 2 along the cut line B-B.

FIG. 3 is a second cross-sectional view of the engine 100 along cut line B-B, which is shown in FIG. 2. As shown in FIG. 3, the sleeve valve body 240 defines a swirl port 302 that directs a fluid 304, which can be an air/fuel mixture, air alone, or some other combination of gases, and/or entrained liquids for injection into the cylinder 204. The swirl port 302 includes a swirl port inlet 306 through which the fluid enters and a swirl port outlet region 308 having a swirl port outlet 310 via which the delivered fluid 304 exits the swirl port 302 into the cylinder 204 (as shown in FIG. 2) around the periphery of the wall of the cylinder 204 in order to create a rotational flow in the combustion volume of the cylinder 204 during the inlet stroke of the left piston 220 and the right piston 222. The combination of the tangentially directed delivery of the delivered fluid 304 and the admitting of the fluid 304 at the periphery of the cylinder 204 (for example near the cylinder wall 234) can result in a rapid rotational flow field inside the combustion volume of the cylinder 204 during the inlet stroke. This ordered flow can persist through the cycle such that when the gases in the combustion volume are ignited, the flame is quickly swept across the combustion volume resulting in a very rapid and very reproducible combustion event.

The swirl port outlet 310 is depicted in FIG. 3 and subsequent figures as a dashed line to indicate an opening or series of openings in the cylinder wall 234 that allow passage of the fluid 304 from the swirl port outlet region 308 into the combustion volume of the cylinder 204. In some advantageous implementations, the swirl port outlet 310 can have the form of a slot of at least approximately constant width in the cylinder wall 234 around at least part of the circumference of the cylinder 204. Optionally, the swirl port outlet 310 can have the form of more than one slot of at least approximately constant width in the cylinder wall that are arranged in series around at least part of the circumference of the cylinder 204. Other configurations, shapes, or dimensions of a swirl port outlet are also within the scope of the current subject matter.

Use of an intake valve that induces a swirling motion of fluids entering the combustion volume of a cylinder of an internal combustion engine, such as for example the sleeve valve body 240 having a swirl inlet port 304 as illustrated in FIG. 3, can be advantageous in creating the above-noted fluid dynamics of the fluid in the combustion volume of a cylinder because it allows entry of the mixture into the cylinder around the whole periphery of the cylinder. Other valve configurations can be used provided they are capable of generating a rotational flow field in the combustion volume of an internal combustion engine cylinder. For example, a poppet valve or other intake valve that is positioned at a cylinder head of a standard internal combustion engine may only be capable of creating rotational flow conditions in the vicinity of the intake valve, which can in many cases have a diameter of about or slightly larger than one half of the diameter of the cylinder. At one half of the diameter, the rotational speed of the gas would need to be twice that of the full diameter inlet to obtain the same in-cylinder rotational velocity. To achieve the same swirl, more pumping work must be done to the incoming charge, which can reduce airflow and limit the torque and/or power of the engine.

As noted above, FIG. 3 illustrates further delivery of the fluid 304 to the combustion volume in the cylinder 204 via a swirl port outlet 310 in the swirl port outlet region 308 such that the fluid enters the cylinder 204 along the periphery of the cylinder wall 234. As noted above, the swirl port outlet 310 can be an opening or multiple openings in the cylinder wall 234 through which the delivered fluid 304 exits the swirl port outlet region 308 into the combustion volume of the cylinder 204. For a swirl port outlet region 308 that wraps around a large fraction of the circumference of the inner wall 312 of the sleeve valve 240, such as is shown in FIG. 3, the swirl port outlet 310 can begin and end at or near a terminating feature 314 of the swirl port 302. As shown in FIG. 3, the cross-sectional flow area of the swirl port outlet region 308 (i.e. based on cross sections taken orthogonal to the direction of flow) can decrease monotonically as the fluid 304 flows from the swirl port inlet 306 to the swirl port outlet region 308 along the series of cross sections A0, which is near the swirl port inlet 306, to A7, which is near the terminating feature 314. The decreasing cross-sectional flow area of the swirl port outlet region 308 causes the fluid 304 to enter the cylinder 204 via the swirl port outlet 310 along the cylinder wall 234 as the fluid 304 traverses the swirl port outlet region 308 and to swirl toward the central axis 316 of the cylinder 204. The principle of conservation of momentum predicts an even faster rotation of the fluid 304 at the center axis 316 of the cylinder 204 than the rotational velocity of the fluid 304 when it first entered the cylinder 204. FIG. 3 illustrates that rotation of the fluid 304 is about the central axis 316 that runs longitudinally through the geometric center of the piston (see FIG. 2) or pistons.

Conceptually, if a tangential velocity exists at a certain radius 320, for example from the central axis 316 to an outer wall 322 of the swirl port outlet region 308, conservation of momentum requires that decreasing the radius 320 for a given flow rate and pressure of gas results in the angular velocity of the gas about the central axis 316 increasing. This increase in angular velocity can occur not only because of the decreasing cross-sectional area of the swirl port outlet region 308, but rather because the delivered fluid 304 carries a tangential velocity of near the cylinder wall 234, and that the fluid 304 is pulled towards the central axis 316 by the space vacated as the pistons 220 and 222 withdraw. The decreasing radius 320 between the central axis 316 and the outer wall 322 of the swirl port outlet region 310 can introduce high velocity fluid flow along or near the cylinder wall 234 while the receding pistons 220 and 222 pull the fluid inwards towards the central axis 316 in a spiral pattern to further increase the angular velocity of the delivered fluid 304 within the cylinder 204. In contrast to current subject matter described herein, a mixture exiting a poppet valve positioned at a cylinder head near the central axis 316 is introduced substantially into the center of a cylinder. The angular velocity of the fluids introduced via such a valve tends to decrease as the flow field of the fluids expands towards the cylinder wall.

The swirl rate of the fluid 304 delivered to the combustion volume of the cylinder 204 can be varied according to specific implementations of the current subject matter. A high swirl rate can increase heat transfer properties of the engine 100. However, a high swirl rate can also affect knock resistance and tolerance of high compression ratios. These characteristics of characteristics of an engine 100 generally require balancing. A high swirl rate can also improve the burn rate which enables the spark timing to be retarded. In other words, the spark can occur later in the combustion cycle or at a later crank angle, etc., before the onset of a misfire or other combustion instability so that the knock level can be mitigated and peak pressures within the cylinder 204 kept within a desirable range even for a large compression ratio. It is likely that the engine 100 can be run at retarded timing at full throttle to limit knock and sacrifice some efficiency while running at more advanced ignition timing (closer to or at MBT) at part throttle to enable high efficiency operation at lower power conditions. These lower power conditions are of particular interest for passenger vehicle operations because full power is rarely achieved, and usually not for long durations.

Opposed piston engines, such as for example the engine 100 shown in FIG. 1 and FIG. 2 and discussed above, include a reduced surface area for heat transfer from the combustion gases in the combustion volume of a cylinder relative to other internal combustion engine configurations. Such engines therefore tend to be impacted less by increased heat transfer from a high velocity gas in the combustion volume than do other internal combustion engines. In some implementations, the left piston 220 and the right piston 222 can include or otherwise be formed of a low thermal conductivity material. An engine having a low surface area to volume ratio of the combustion volume at the TDC position of the piston or pistons can in some implementation have pistons with relatively small in diameters that therefore contain less bulk material than do the pistons in other internal combustion engines. In one non-limiting example, the pistons in the engine 100 can be formed at least partially of a low thermal conductivity material such as cast iron. Use a low thermal conductivity material for the pistons can allow more of the heat generated in the combustion event to be retained in the gas and therefore available to do work.

Creating a high swirl rate in the combustion volume of the cylinder 204 or cylinders can allow an engine to achieve a high efficiency without the need for a variable compression ratio. Instead, an engine that includes improvements in accordance with one or more features of the disclosed subject matter can, in some examples, utilize spark advance control to allow a retarded or delayed ignition condition at high throttle with advanced timing at part throttle. As an illustrative, non-limiting example, manifold or venturi vacuum can be used to provide advance spark control.

The swirl rate of the delivered fluid 304 within the cylinder 204 can in some implementations be adjusted by changing the cross-sectional area A1 of the output port region 104 of the sleeve valve body 240. In some implementations, a mean port flow velocity of the delivered fluid 304 travelling through the swirl port outlet region 308 can be 90 m/sec. The term "mean port flow velocity" indicates an arbitrary nominal average velocity of the fluid as it travels through the swirl port outlet region 308. The mean flow velocity of the fluid 304 within the swirl port outlet region 308 can vary, which can result in the fluid 304 swirling in the cylinder 204 by as much as approximately six or more times faster than the crankshaft speed. These values can be achieved or even exceeded in a small bore engine, for example. The swirl in the cylinder 204 can be proportional to the cross-sectional area of the swirl port outlet region 308. If the cross-sectional area A1 of the swirl port outlet region 308 is increased, the tangential velocity of the fluid 304 entering the cylinder 204 can be reduced. Similarly, the rotation speed of the swirl of the fluid 304 can also be reduced. The angle at which the fluid 304 enters the cylinder 204 from the swirl port outlet region 308 across the swirl port outlet 310 can change with the tangential velocity of the fluid 304. A high tangential fluid velocity in the swirl port outlet region can result in a shallow entry angle in that the fluid 304 will tend to be directed along the cylinder wall 234 as it crosses the swirl port outlet 310 from the swirl port outlet region to the cylinder 204, while a lower tangential fluid velocity in the swirl port outlet region can result in a steeper entry angle of the fluid 304 as it crosses the swirl port outlet 310 from the swirl port outlet region to the cylinder 204. A shallow angle can reduce the effective valve open area, which can limit the maximum fluid flow through the valve. Additionally, the swirl port 302 can be designed so that a tubular section of the swirl port inlet 306 approaches the swirl port outlet region 308 at the angle at which the fluid 304 is desired to pass from the swirl port outlet region 308 into the cylinder 204. As such, a design with high swirl would have a lower maximum mass flow and a more tangential arrangement of the swirl port inlet 306 as it approaches the swirl port outlet region 308 (for example at cross section A1 as shown in FIG. 2). Correspondingly a swirl port 302 designed for lower swirl can provide a larger maximum flow and via a greater angle of the swirl port inlet 306 as it approaches the swirl port outlet region 308.

FIG. 3 illustrates that the cross-sectional area of the swirl port outlet region 308 (shown as cross-sectional areas A1-A7, each measured between the outer wall 322 of the swirl port outlet region 308 to the inner wall 312 of the sleeve valve 240, gradually reduces in area from A1 (greatest cross-sectional area) at the beginning of the swirl port outlet region 308 down to substantially zero where the swirl port outlet region 308 reaches the terminating feature 314, which can in some implementations be approximately 340° from the beginning of the swirl port outlet region 308. FIG. 3 shows one example of possible cross-sectional areas A1-A7 of a swirl port 302. These cross-sectional areas reduce as the fluid 304 passes through the swirl port outlet region 308 and into cylinder 204. The reduction of cross-sectional area of the swirl port outlet region 308 forces a portion of the fluid 304 into the combustion volume of the cylinder 204 via the swirl port outlet 310, which creates a radial component of the flow of the fluid 304. If the cross-sectional area of the swirl port outlet region 308 did not gradually decrease as shown in FIG. 3, the fluid 304 would preferentially enter the cylinder 204 at the end of the swirl port outlet region 308 (i.e. upon encountering the terminating feature 314), which can substantially limit the effective area of the valve. In such a design, angular momentum would predominantly keep the fluid 304 near the outer wall 322 of the swirl port outlet region 308 until the fluid 304 encountered the terminating feature 314.

Also as shown in FIG. 3, the terminating feature 314 of the swirl port outlet region 308 can be disposed such that it forms an angle θ with a line tangent to the inner wall 234 of the cylinder 204. In a non-limiting illustrative example, the angle θ can be approximately 30°. Other angles are also within the scope of the disclosure. The swirl port inlet 306 can also optionally include a slight bend or otherwise include one or more non-linear features. The swirl port inlet 306 can alternatively or additionally be designed to force droplets of fuel, for example fuel is injected in or near the swirl port inlet 306 by injectors 326 and 330 as shown in FIG. 3, to impinge on the hot sleeve surface of the sleeve valve body 240 as these fuel droplets enter the swirl port outlet region 308 at section A1.

Figure 4:
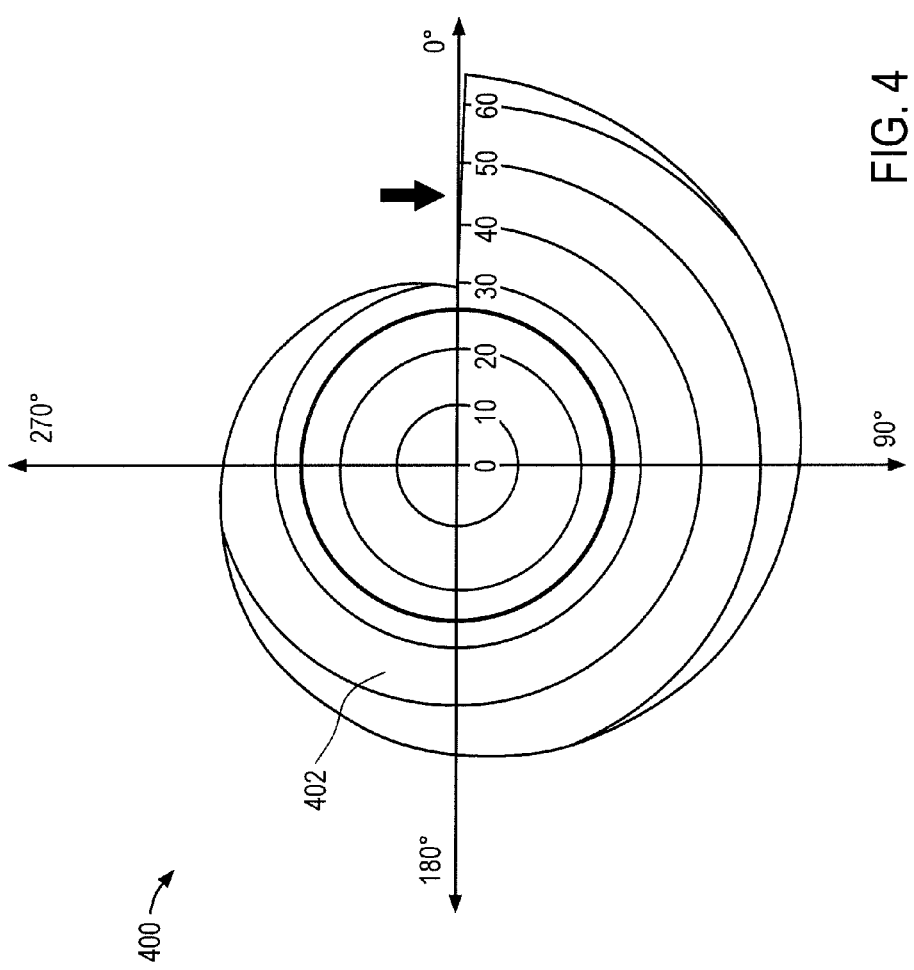
FIG. 4 is a graph showing a representation of the decreasing area of a swirl port inlet region as a function of its circumferential position around a cylinder.

FIG. 4 is a graph 400 that depicts the decreasing area of the pathway within the swirl port outlet region 308 as a function of circumferential position around the central axis C of the cylinder 204 according to an illustrative, non-limiting implementation of the current subject matter. The radial width of the pathway or cavity 402 within the swirl port outlet region 308 between the outer wall 322 of the swirl port outlet region 322 and the cylinder wall 234 is shown in FIG. 4 with 0° indicating the beginning of the swirl port outlet region and the fluid flow progressing in a clockwise direction around the circumference of the cylinder 204. The product of the distance between the outer wall surface 322 of the swirl port outlet region 308 and the bore radius of the cylinder 204 (distance between the central axis 316 and the cylinder wall 234) at each point around the circumference of the cylinder 204 and the port depth perpendicular to the viewing plane can define a cross-sectional area for flow of the cavity within the swirl port outlet region 308 and, accordingly, for the swirl port 302 as a whole. Alternatively, for a swirl port outlet region 308 having a circular cross sectional flow area (for example at each point A1 to A7 and all points between), the cross sectional area for flow of the cavity within the swirl port outlet region 308 (and for the swirl port 302 as a whole) can be Pi (π) divided by four times the square of the distance between the outer wall surface 322 of the swirl port outlet region 308 and the bore radius of the cylinder 204 at each point. FIG. 4 shows a circumferentially reducing perimeter of the outer wall 322 of a swirl port outlet region 308 having a circular cross section with an Archimedean spiral geometry in which the cross sectional area decreases linearly as a function of the radial angle about the central axis 316 of the cylinder 204. In this geometry, approximately equal amounts of the delivered fluid 304 can enter the cylinder 204 by passing through the swirl port outlet 310 at any angular location around the swirl port outlet region 308. Other cross-sectional shapes and configurations of a swirl port outlet region are also within the scope of the current subject matter. For example, the cross sectional area of a swirl port outlet region 308 need not decrease linearly with the radial angle, and other spiral geometries besides Archimedean can be used. Also, the depth of the cavity can be adjusted to vary the cross sectional flow area. Specific dimensions and geometries for a specific swirl port 302 can vary depending on engine configurations and design requirements. Advantageously, the cross sectional area of the swirl port outlet region 308 decreases monotonically around the circumference of the cylinder 204 from the swirl port inlet 306 to the terminating feature 314 of the swirl port outlet region 308. In some implementations, there is no flow in the manifold when the valve is closed. The pressure difference between the manifold and the inside of the cylinder causes the flow to begin movement as the valve opens.

Figure 5:
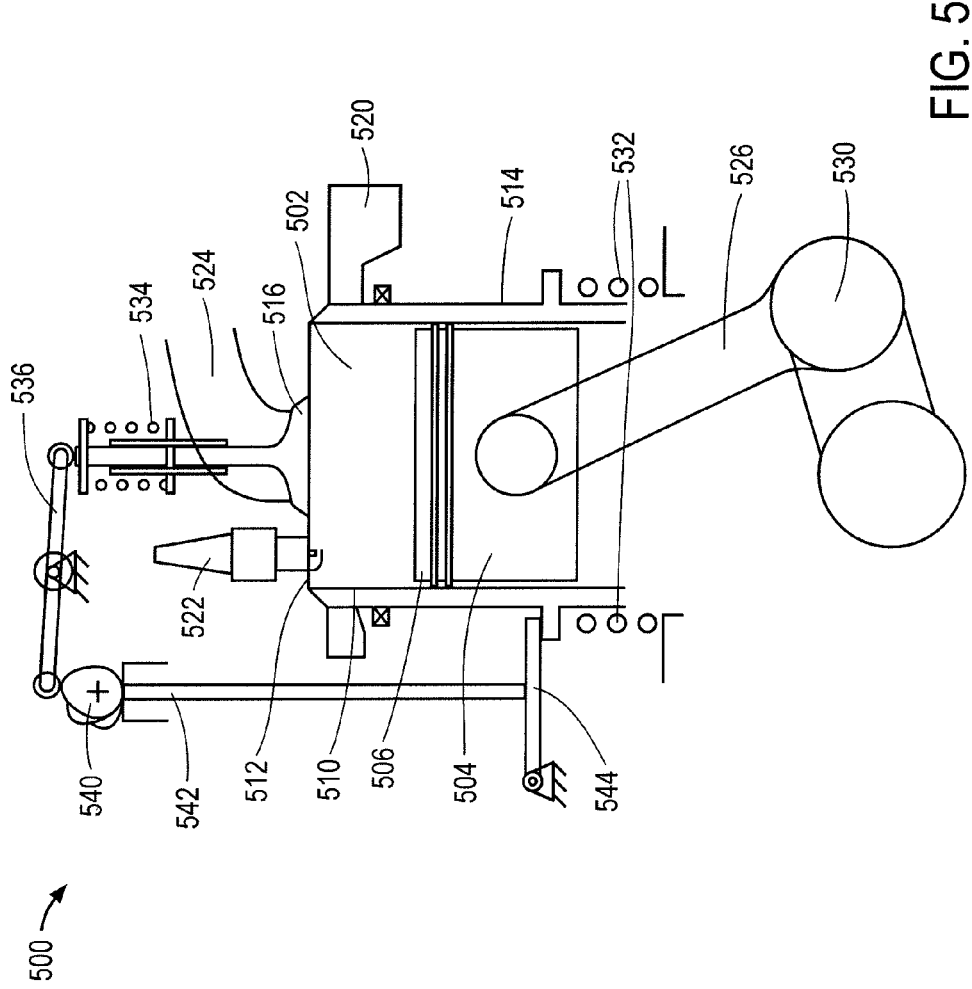
FIG. 5 is a schematic diagram showing a cross-sectional view of a cylinder, valving, and other features of an internal combustion engine without opposed pistons.

FIG. 5 illustrates an alternative implementation of the current subject matter for a conventional internal combustion engine 500 in which a cylinder 502 contains only one piston 504 whose piston head 506 defines a combustion volume in combination with the cylinder walls 510 and a cylinder head 512. A sleeve valve 514 can deliver a fluid, which can be air, a fuel/air mixture, or some other fluid or combinations thereof, to the combustion volume such that a swirling motion is produced within the combustion volume in a manner similar to that discussed above. The sleeve valve 514 can be disposed either in the cylinder head 512 or along the cylinder walls 510 as shown in FIG. 5. Alternatively or in addition, one or more poppet valves 516 can be positioned in a configuration that deliver a fluid or fluids to the combustion volume in a similar manner. The illustrative but non-limiting example shown in FIG. 5 includes a sleeve valve 514 that moves along the cylinder block walls controlling intake flow through an inlet swirl port 520 used to generate swirl, and a single poppet valve 516 in the center of the cylinder head 512 operating as the exhaust valve. The poppet valve 516 need not be located in the center of the cylinder head 512. One or more spark plugs 522 can be situated between the edge of the exhaust port 524 controlled by the poppet valve 516 and the cylinder wall 510. Also shown in FIG. 5 are the piston connecting rod 526, the crankshaft 530, an inlet valve spring 532, and apparatus for coordinating the operation of the poppet valve 516 and the sleeve valve 514. The apparatus can include, for example, an exhaust valve spring 534, a rocker arm 536, a cam 540, an inlet valve pushrod 542, and an inlet valve actuator 544 as shown in FIG. 5. Other configurations are within the scope of the current subject matter.

The engine configuration shown in FIG. 5 can also be used with a single inlet sleeve valve 514 and multiple poppet valves 516 controlling multiple exhaust ports 524. One or more spark plugs 522 could also be positioned advantageously to accommodate such a configuration. In some implementations, fuel droplets exiting the inlet swirl port 520 into the combustion volume can be directed toward the cylinder wall 510 to cause the fluid mixture near the periphery of the combustion volume outside richer and easier to ignite. In this example, advantageous locations for the spark plugs 522 can be one or more of in the cylinder head 512 near the cylinder walls 510 and in the cylinder walls 510 similarly to the configuration shown in FIG. 2. Generation of a mixture gradient as described can be used in both single piston and opposing/dual piston engine configurations.

The engine configuration shown in FIG. 5 can also include a single, relatively smaller cross sectional area poppet valve 516 in the cylinder head 512 near the center axis of the cylinder 510. This poppet valve 516 can function as the inlet valve while, the sleeve valve 514 serves as an exhaust valve. Compared to having the poppet valve 516 control the exhaust port 524 and account for a larger portion of the surface area of the cylinder head 512, such a configuration may not achieve the same heat retention properties but may allow overall higher compression ratios because of the intake valve remains at a lower temperature and thus knock propensity may be reduced. This configuration directs the delivered fluid to the outside of the cylinder (as shown in FIG. 3), which can create a lower swirl velocity within the combustion volume as described above. However, depending on the specific features of an engine, such a valve configuration and the resulting lower swirl conditions can still achieve one or more of the advantages discussed herein.

Figure 6:
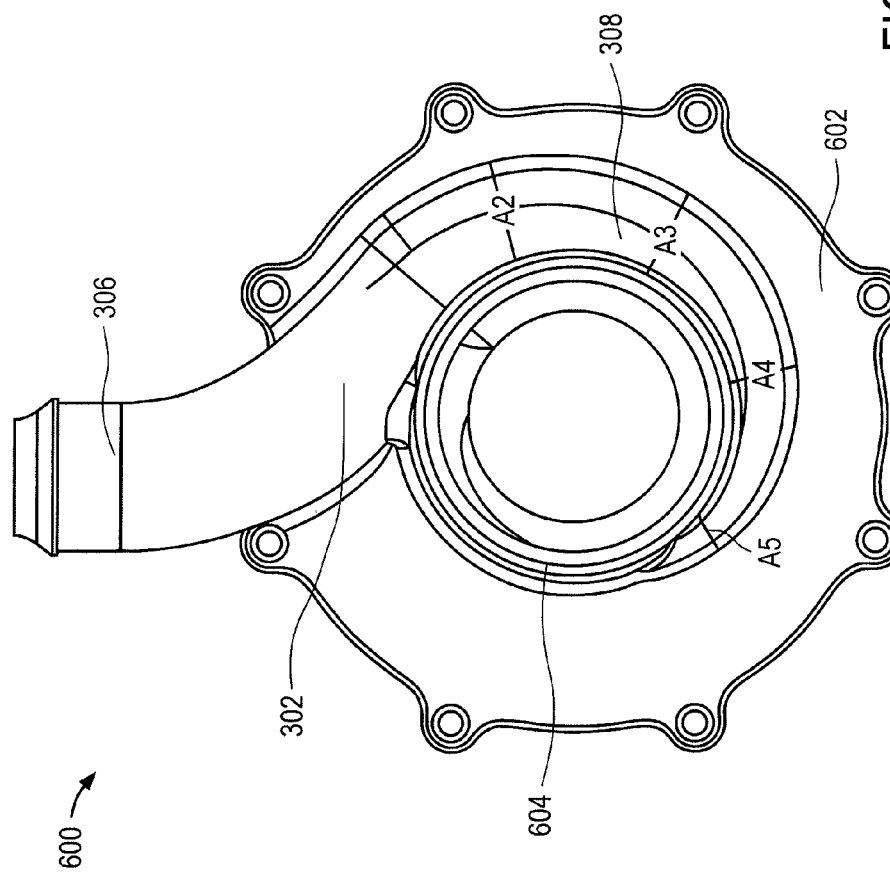
FIG. 6 is a diagram showing an elevation view of a swirl port looking down a centerline of an internal combustion engine cylinder.

FIG. 6 and FIGS. 7A and 7B show a series of views of a sleeve valve body 240 including a swirl port consistent with the current subject matter. FIG. 6 shows a front rendering of the sleeve valve body 240 having a swirl port 302 as shown in FIG. 3. As depicted, the sleeve valve body 240 includes a mounting plate 602 for mounting to the engine body 206. The swirl port 302 includes a swirl port inlet 306 and a swirl port outlet region 308. The opening in the swirl port outlet region 308 that allows a fluid to pass form the swirl port outlet region 308 to a combustion volume in the cylinder is not visible in FIG. 6 as it is hidden by a flange face 604. Also as shown in FIG. 6, and as previously discussed above, the cross sectional area of the swirl port outlet region 308 decreases from the swirl port inlet 306 to the end of the scroll shaped swirl port outlet region 308. A few cross sectional areas of the swirl port 302 are shown in FIG. 6 for illustrative purposes only (e.g., A2, A3, A4, A5) and correspond with the cross sectional areas depicted in FIG. 3. In the design depicted in FIG. 6, the area projection of the swirl port outlet (which can be the valve lift multiplied by the circumference of the cylinder) can be approximately twice the cross sectional flow area at the swirl port inlet 306.

A choice of the cross sectional flow area at the swirl port inlet 306 in relationship to the cylinder displacement and the engine design speed can establish the tangential velocity of the fluid 304 upon delivery to the combustion volume. This tangential velocity combined with the net radial velocity can determine the angle at which the fluid flow crosses the valve opening. This angle can determine the effective area of the valve in that the effective area can be at least approximately equal to the product of the sine of the fluid flow across the valve opening and the projected area of the valve opening. As the projected area of the swirl port outlet 310 in FIG. 6 is twice the cross sectional flow area at the swirl port inlet 306, a 30 degree angle can be used for the fluid flow across the swirl port outlet 310, which can also be thought of as the valve opening. In this way, the projected area of the valve is reduced by the sine of 30 degrees, which can give a near constant velocity to the fluid 304 from the swirl port inlet 306 to the final exit of fluid into the cylinder 204 at the swirl port terminating feature 314, even though the fluid 304 is continuously being delivered from the swirl port outlet region 308 to the cylinder 204 through the swirl port outlet 310 as it flows around the periphery of the cylinder 204.

FIG. 7A and FIG. 7B depict two renderings of the cavity 402 within the swirl port 302 that the fluid 304 travels within from the swirl port inlet 306 through the swirl port outlet region 308. In FIGS. 7A and 7B, the cavity 402 within the swirl port 302 is shown as a solid component for ease of viewing only. As shown, the cross sectional area of the cavity 402 reduces from the swirl port inlet 306 through the swirl port outlet region 308 to the terminating feature 314. Also as shown in FIGS. 7A and 7B that the entire cavity 402 need not have the same or even similar geometry.

While the forgoing has described a mixture of fuel and air passing through the port, this subject matter described herein can also be applied to air only flows used with direct, in-cylinder fuel injection. Direct injection can be done early in the cycle for a fuel like gasoline for spark ignition or near top dead center (TDC) for a fuel like diesel. One or more injectors can be used to distribute the fuel in the combustion volume. Such a configuration can be used in conjunction with a traditional diesel cup and cone piston, or with an engine having pistons in an opposed piston configuration, to compress the already high swirl to an even higher value in the center of the cylinder utilizing the conservation of momentum as previously described.

One injection strategy consistent with the current subject matter includes injecting fuel at a rate proportional to the rotation rate of the air in the combustion volume. For example, for an engine in which fuel is introduced over 30 crank angle degrees and a swirl rate inside the combustion volume is six times the crankshaft rotation speed, delivery of the fuel via two injectors separated by the diameter of the cylinder causes half of the air charge to be swept past each of the fuel injectors while the fuel is injected, thereby causing the uniform distribution of the fuel through the air. An injection timing as described above can result in a relatively lower pressure rise rate in the combustion volume. Alternatively or in addition, an early injection can be used to raise the chamber temperature and pressure before the main injection such that the ignition delay for the following fuel can be minimized. A short ignition delay and a longer injection duration can result in a lower pressure rise rate which can reduce the load on the engine structure and permit construction of lighter, more cost effective engines.

In some implementations, it can be advantageous to create injected droplets whose size is sufficiently small that the momentum of a droplet carries it only to a maximum of about half way across the cylinder 204. FIG. 8A and FIG. 8B show cross sectional views looking along the central axis 316 of a cylinder and perpendicular to the central axis 316, respectively. A swirl port 302 having a swirl port inlet 306 and a swirl port outlet region 308 in which is positioned a swirl port outlet 310 can provide air to the combustion volume within the cylinder 204. Two fuel injectors 802 can be positioned to direct droplets of fuel 804 into the combustion volume. It can be advantageous for the injected plume of fuel droplets 804 to be broad and relatively flat to minimize contact with the piston 220. Additionally or alternatively, the piston crown 806 can be shaped to avoid the plume of fuel droplets 804.

FIG. 9 shows features of an implementation in which a swirl port 900 is capable of delivering air to a cylinder 204 either in a substantially normal direction to the cylinder central axis 316 or more tangentially to the cylinder walls 234. The port 900 includes an inlet 902 that is divided into a first section 904 and a second section 906. At light loads and air flows, the first section 904 can be closed or otherwise blocked, for example by a valve or the like, thereby forcing all of the intake air through the open second section 906 to induce a tangential component of fluid flow as the fluid exits the part of the port outlet region 908 in fluid communication with the second section 906 and enters the cylinder 204 though a port outlet 910. The part of the port outlet region 908 in fluid communication with the second section 906 can have some of the characteristics of the swirl port outlet region 308 discussed above. However, as shown in FIG. 9, this portion of the port outlet region 908 may not traverse as much of the circumference of the cylinder 204 as does the swirl port outlet region 308 discussed above and shown in FIG. 3. Both of the first section 904 and the second section 906 can be opened to allow a high fluid flow rate with less pronounced turbulence levels and less heat loss for higher efficiency at higher engine loads. FIG. 10 shows a further variation of the implementation shown in FIG. 9 that can produce an enhanced swirl rate at light loads. The port outlet region 908 can be extended to include a greater fraction of the circumference of the cylinder 204 such that when the first section 904 of the inlet 902 is closed, fluid delivered to the cylinder 204 via the second section 906 can be delivered across a port outlet 910 that spans a greater part of the circumference of the cylinder 204, thereby imparting a greater tangential velocity and inducing more pronounced swirl in the combustion volume. Under typical driving conditions, an engine can operate most frequently at lighter loads. An enhanced swirl rate can extend the lean operating range to minimize the formation of $NO_x$.

Figure 11:
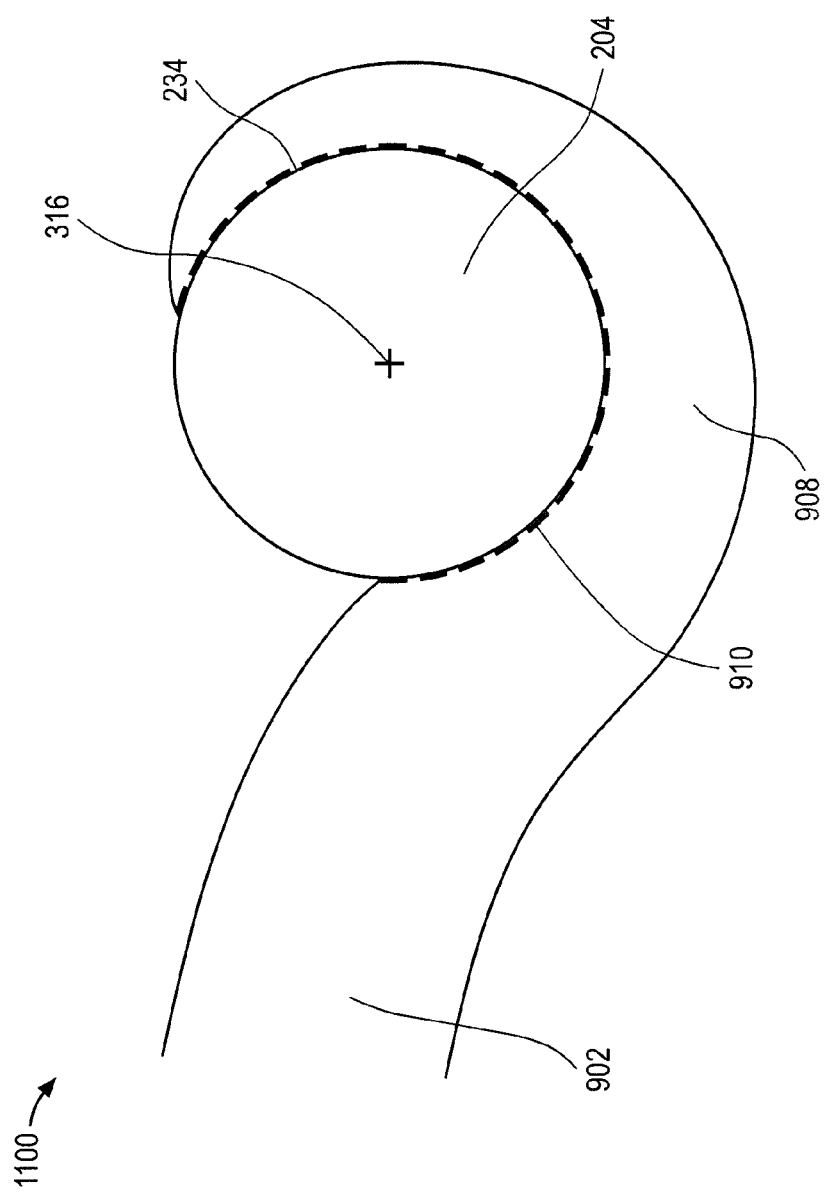
FIG. 11 is a schematic diagram showing a cross-sectional view of an inlet port capable of a reduced swirl rate.

FIG. 11 shows a reduced swirl rate port 1100 in which the port velocity can be maintained at or near a constant while the delivery angle to the cylinder 204 can be increased to reduce the tangential velocity. In this way, it may not be appropriate to use the whole periphery of the cylinder if the cross sectional flow areas of the port outlet 910 and port inlet 902 are the same as was discussed above.

For example, a swirl port as discussed above can in some implementations have a swirl number of six (6), which indicates that the flow of fluid in the cylinder 204 completes six revolutions about the cylinder 204 in the time it takes the piston to go up and down once. This condition can be achieved in one illustrative example by designing the swirl port to provide a constant 90 m sec$^{-1}$ flow velocity with a port outlet 910 (valve) opening that supports only 45 m sec$^{-1}$ if the fluid flow were to arrive normal to the opening of the port outlet 910. To keep the fluid flow velocity constant, the fluid 304 can arrive at a 30° angle to the opening of the port outlet 910, which effectively reduces the effective opening area of the port outlet 910 by half (sine of 30°=0.5). For the fluid 304 flowing through the port to maintain its speed at 90 m sec$^{-1}$ as passes through the opening of the port outlet 910, the tangential velocity is equal to the cosine of 30° times the fluid flow velocity of 90 m sec$^{-1}$ or 78 m sec$^{-1}$. 78 m sec$^{-1}$ divided by the circumference of the cylinder 204 (i.e. π times the cylinder bore diameter), which is this illustrative example is 51 mm) diameter bore gives about 480 revolutions per second at the outside diameter of the cylinder bore. At 4800 rpm, this produces a swirl ratio of six. To maintain the 90 m sec$^{-1}$ fluid flow velocity while reducing the swirl number, the angle at which the flow enters the cylinder 204 via the port outlet 910 must be increased such that the tangential component of the fluid flow velocity is reduced. For example if the fluid flow crosses the port outlet 910 at an angle of 60° instead of 30°, the cosine of 60° is 0.5 so the tangential velocity of the fluid flow in the cylinder 204 is 90 m sec$^{-1}$ times 0.5 or 45 m sec$^{-1}$, which is equivalent to about 240 revolutions per second in the example cylinder noted above, thereby giving a swirl number of three. However, this modification also changes the effective area of the port outlet 910 (valve opening) by a factor of sine of 30° divided by sine of 60° (because for a port outlet 910 shaped like a slot of constant width around the circumference of the cylinder 204, the effective area of the port outlet 910 is the product of the sine of the entry angle, the bore perimeter, and the height of the port outlet 910 or valve opening). Thus, to keep the fluid flow velocity constant, the projected area of port outlet 910 (valve opening) should be reduced by the ratio of sine of 30° divided by sine of 60°. This reduction can be achieved in some implementations by decreasing the valve lift (height of the opening of the port outlet 910) by this ratio, or by reducing how far around the circumference of the cylinder 204 the outlet port region 908 (and similarly the port outlet 910) extends by this ratio. If the extent of the port outlet 910 around the circumference of the cylinder 204 is reduced, it can be necessary to taper the cross sectional flow area of the port outlet region 908 more quickly to have it get from the cross sectional flow area at the port inlet 902 to zero when the fluid has a higher radial velocity and a slower tangential velocity. One exemplary solution to this issue would be to change the angle theta between the terminating feature 314 as shown in FIG. 3 and the cylinder wall 234 to 60 and to only wrap the port outlet region 908 about (0.5/0.86) times 360°=207° around the circumference of the cylinder 204.

Thus, as illustrated by the above described example, a lower swirl rate in the cylinder 204 can require a lower tangential velocity of the fluid entering the cylinder. However, maintaining the same flow velocity can result in a correspondingly higher radial velocity. If the fluid exits the port outlet 910 into the cylinder 204 at a higher rate, it may be necessary to reduce the projected area of the port outlet 910 to maintain the same fluid velocity in the swirl port. This can be accomplished using a shorter valve lift (smaller height of a slot-shaped port outlet 908) or by shorter wrap length (smaller extent of a slot-shaped port outlet around the circumference of the cylinder 204.

Figure 12:
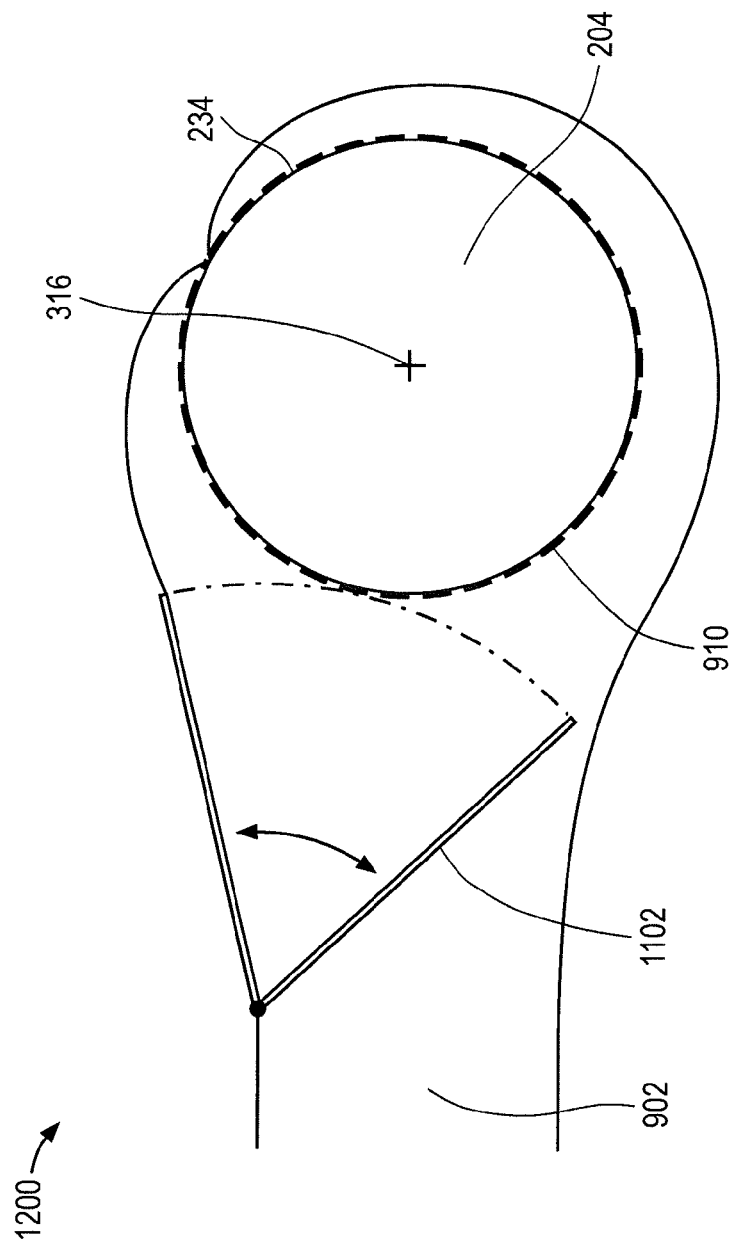
FIG. 12 is a schematic diagram showing a cross-sectional view of an inlet port capable of either high or low swirl delivery of a fluid.

FIG. 12 shows another example of an inlet port 1200 that can create a swirl condition in a cylinder. A spring or throttle actuated vane 1202 can be used to direct fluid flow to one side of the port inlet 902 at low loads and to allow fluid flow to be directed in both directions around the cylinder 204 at high loads. The vane 1202 can impart particularly high tangential velocities at low loads to further enhance the lean operating limits.

Figure 13:
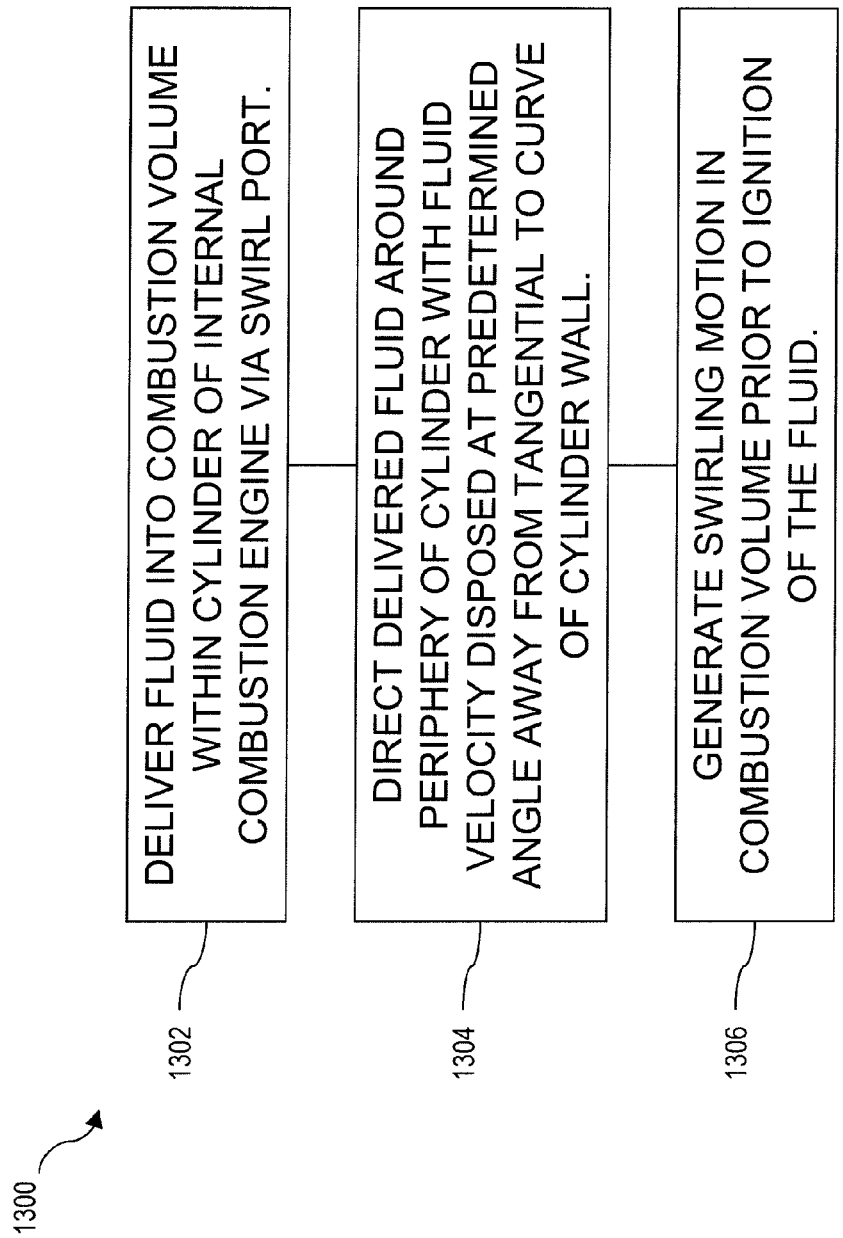
FIG. 13 is a process flow chart illustrating a method.

FIG. 13 shows a process flow chart 1300 illustrating a method for operating an internal combustion engine. At 1302, the method can include delivering a fluid into a combustion volume within a cylinder of an internal combustion engine via a swirl port. The combustion volume can be defined at least by a cylinder wall and a piston in the cylinder. At 1304, the delivered fluid can be directed around a periphery of the cylinder with a fluid velocity disposed at a predetermined angle away from tangential to a curve of the cylinder wall. At 1306, the directing of the delivered fluid can generate a swirling motion in the combustion volume prior to ignition of the fluid. The swirling motion can occur at a swirl rate quantified by a swirl number that indicates a number of revolutions around the cylinder made by the fluid during a cycle of the piston.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:
1. An internal combustion engine, comprising:
   a combustion volume within a cylinder of an internal combustion engine that is defined at least by a cylinder wall, a piston in the cylinder, and a sleeve valve that is slidably moveable parallel to an axis along which the piston reciprocates;
   a swirl port defined by the sleeve valve, the swirl port delivering a fluid into the combustion volume via a swirl port outlet such that the delivered fluid is directed around a periphery of the cylinder with a fluid velocity disposed at a predetermined angle away from tangential to a curve of the cylinder wall to generate a swirling motion in the combustion volume, the swirling motion occurring at a swirl rate quantified by a swirl number that indicates a number of revolutions around the cylinder made by the fluid during a cycle of the piston, the swirl port opening and closing as a result of the sleeve valve slidably moving parallel to the axis along which the piston reciprocates, the swirling motion creating a richer fuel mixture region nearer the cylinder wall than a center of the cylinder, wherein the swirl port generates a greater swirl motion angular velocity at a center of the cylinder compared to the periphery, which causes fuel molecules to be pushed towards the periphery; and
   an ignition source positioned along the periphery of the cylinder for igniting the richer fuel mixture region.
2. An internal combustion engine as in claim 1, wherein the ignition source comprises a spark source.
3. An internal combustion engine as in claim 1, wherein an inlet of the swirl port has a first cross sectional flow area and a swirl port outlet region that comprises the swirl port outlet has a second cross sectional flow area that decreases with distance from the inlet, and wherein the swirl port outlet does not change in size with distance from the inlet.
4. An internal combustion engine as in claim 1, wherein the sleeve valve is disposed at least partially around the cylinder, and wherein the swirl port comprises a tube of decreasing cross sectional area.
5. An internal combustion engine as in claim 1, further comprising a fuel injector that delivers fuel to the combustion volume with an injection rate that is proportional to the swirl rate, wherein the internal combustion engine is configured to operate as a diesel engine.
6. An internal combustion engine as in claim 1, further comprising a fuel injector that delivers fuel to the combustion volume with an injection rate that is proportional to the swirl rate, wherein the internal combustion engine is configured to operate as a direct injection spark ignited engine.

7. An internal combustion engine as in claim 6, wherein the fluid comprises air, the spark source is positioned at the periphery of the cylinder, and the fuel injector injects the fuel such that droplets of the fuel are mixed with the delivered fluid so that the centripetal force induced by the swirl motion forces the droplets to the periphery of the cylinder to create a mixture gradient that comprises a more fuel rich region at the periphery for ignition by the spark source.

8. An internal combustion engine as in claim 1, wherein the swirl number is equal to a tangential velocity of the fluid as it exits the swirl port outlet into the cylinder divided by the circumference of the cylinder and by a crankshaft rotation rate of a crankshaft of the engine.

9. An internal combustion engine as in claim 8, wherein the tangential velocity is equal to the cosine of an exit angle of the fluid passing through the swirl port outlet into the cylinder times a flow velocity of the fluid in the swirl port.

10. A method comprising:
delivering a fluid into a combustion volume within a cylinder of an internal combustion engine via a swirl port defined by a sleeve valve, the combustion volume being defined at least by a cylinder wall, a piston in the cylinder, and the sleeve valve, the sleeve valve being slidably moveable parallel to an axis along which the piston reciprocates, the swirl port directing the delivered fluid around a periphery of the cylinder with a fluid velocity disposed at a predetermined angle away from tangential to a curve of the cylinder wall;
generating, by the directing of the delivered fluid, a swirling motion in the combustion volume prior to ignition of the fluid, the swirling motion occurring at a swirl rate quantified by a swirl number that indicates a number of revolutions around the cylinder made by the fluid during a cycle of the piston, the swirling motion creating a richer fuel mixture region nearer the cylinder wall than a center of the cylinder, wherein the swirl port generates a greater swirl motion angular velocity at a center of the cylinder compared to the periphery, which causes fuel molecules to be pushed towards the periphery;
igniting the richer fuel mixture region with an ignition source positioned along the periphery of the cylinder; and
opening and closing the swirl port by the sleeve valve slidably moving parallel to the axis along which the piston reciprocates.

11. A method as in claim 10, wherein the ignition source comprises a spark source.

12. A method as in claim 10, wherein an inlet of the swirl port has a first cross sectional flow area and a swirl port outlet region that comprises the swirl port outlet has a second cross sectional flow area that decreases with distance from the inlet, and wherein the swirl port outlet does not change in size with distance from the inlet.

13. A method as in claim 10, wherein the sleeve valve is disposed at least partially around the cylinder, and wherein the swirl port comprises a tube of decreasing cross sectional area.

14. A method as in claim 10, further comprising delivering fuel to the combustion volume with a fuel injector with an injection rate that is proportional to the swirl rate, wherein the internal combustion engine is configured to operate as a diesel engine.

15. A method as in claim 10, further comprising operating the internal combustion engine as a direct injection spark ignited engine, the operating comprising: delivering fuel to the combustion volume with a fuel injector having an injection rate that is proportional to the swirl rate; and igniting the distributed fuel with a spark source.

16. A method as in claim 15, wherein the fluid comprises air, the spark source is positioned at the periphery of the cylinder, and the fuel injector injects the fuel such that droplets of the fuel are mixed with the delivered fluid so that the centripetal force induced by the swirl motion forces the droplets to the periphery of the cylinder to create a mixture gradient that comprises a more fuel rich region at the periphery for ignition by the spark source.

17. A method as in claim 10, wherein the swirl number is equal to a tangential velocity of the fluid as it exits the swirl port outlet into the cylinder divided by the circumference of the cylinder and by a crankshaft rotation rate of a crankshaft of the engine.

18. A method as in claim 17, wherein the tangential velocity is equal to the cosine of an exit angle of the fluid passing through the swirl port outlet into the cylinder times a flow velocity of the fluid in the swirl port.

19. An internal combustion engine as in claim 1, further comprising a fuel injector positioned to deliver fuel to the fluid in an inlet of the swirl port such that droplets of the fuel entering the combustion volume through the outlet region are directed toward the cylinder wall.

\* \* \* \* \*